United States Patent [19]

Mueller et al.

[11] 4,416,538

[45] Nov. 22, 1983

[54] IMAGE ENHANCEMENT

[75] Inventors: Peter F. Mueller, Concord; H. John Caulfield, Nagog Woods, both of Mass.

[73] Assignee: Aerodyne Research, Inc., Billerica, Mass.

[21] Appl. No.: 328,021

[22] Filed: Dec. 7, 1981

[51] Int. Cl.³ .............................................. G03B 27/54
[52] U.S. Cl. ................................. 355/67; 350/162.12; 355/77
[58] Field of Search ........................ 355/40, 43, 67, 70, 355/71; 350/162.12

[56] References Cited

U.S. PATENT DOCUMENTS 3,912,386 10/1975 Gorog et al. .............. 350/162.12 X
4,153,336 5/1979 Minami et al. ................. 350/162.12

Primary Examiner—Richard A. Wintercorn
Attorney, Agent, or Firm—Frank A. Steinhilper

[57] ABSTRACT

Image enhancement is achieved to increase the ability to distinguish details otherwise difficult to discern in bright and dark areas of a photorecord by reflecting light off surface perturbations on the record and displaying the reflected light by means of schlieren optics.

7 Claims, 5 Drawing Figures

U.S. Patent  Nov. 22, 1983  4,416,538
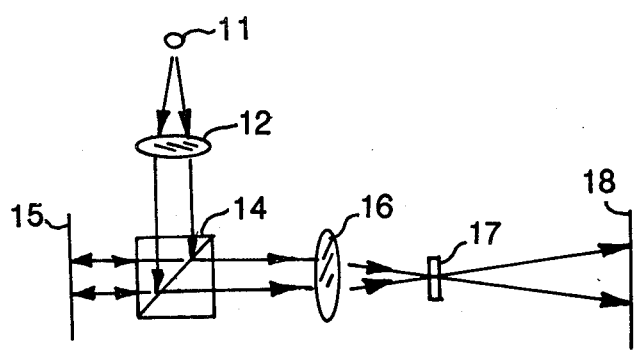
FIG. 1
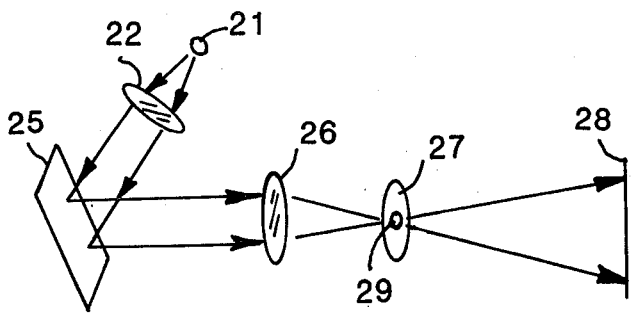
FIG. 2
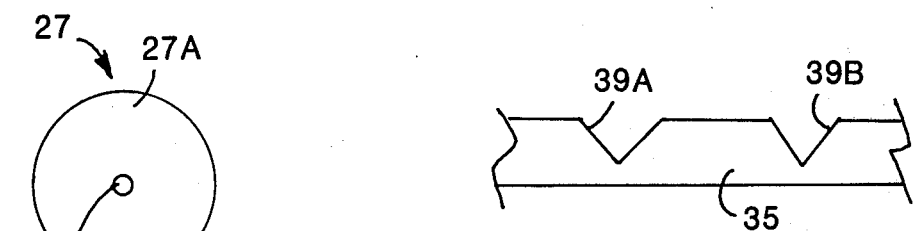
FIG. 3
FIG. 5
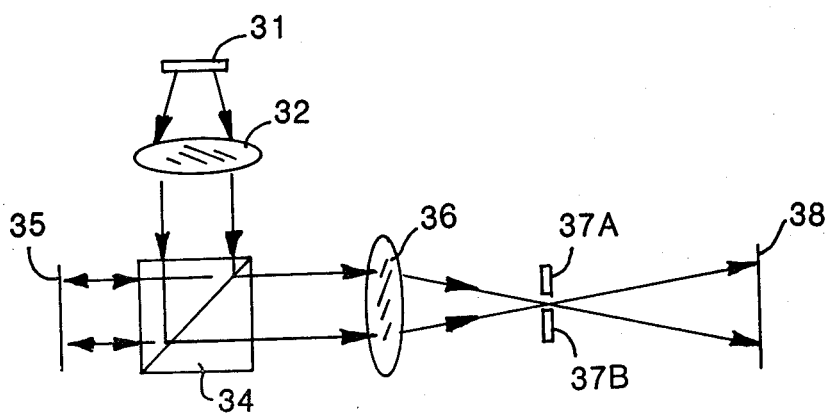
FIG. 4

IMAGE ENHANCEMENT

BACKGROUND OF THE INVENTION

In many uses and applications of photography it is desired to obtain greater detail than can be seen upon ordinary examination of a photographic film or print. Particularly in the type of photography that can be considered utilitarian rather than artistic, such as industrial or engineering uses and applications, medical photography and particularly X-ray photography, and in scientific and experimental operations seeking information from a picture, it is desirable to look for details in a picture which are hidden from normal visual examination. Typically, in many instances desired details in light picture areas and details in dark picture areas of the same photographic record may be hidden in the glare and in the shadow.

The present invention uses surface characteristics of a photographic layer to enhance or even to replace the photographic image which ordinary visual examination sees as density differences. Instead of seeing only or primarily different areas of black and white in which light is absorbed or reflected by the pressure or absence of black silver in a gelatin emulsion, the present invention utilizes surface characteristics of a photographic layer such as a conventional gelatin emulsion with a developed silver image. Previous efforts to use the surface or relief characteristics of photographic emulsions have been unsuccessful except in certain specific cases such as microscopic examination of extremely small areas of the photographic image.

It is well known that differential tanning and other effects produce a surface relief on photographic emulsions such as silver halide gelatin or similar emulsions, and it is known that the surface relief or surface perturbations in such emulsions are greater in areas where there is a changing photographic density in the image and lesser in the areas where there is a constant or nearly constant density. In particular, in relatively uniform dark areas and in relatively uniform bright areas the densities may be extreme, and the shadows and glare consequently very strong, but the surface characteristics in such areas show perturbations where there are less visible differences corresponding to details within such areas.

GENERAL NATURE OF THE INVENTION

According to the present invention, image enhancement of a photographic image on a photoreceptor is brought about to display increased detail in areas where detail is difficult to see, such as extremely light image area or extremely dark image areas, by forming a photographic image by exposure to activating radiation such as ordinary light, infrared, ultraviolet, X-ray, or other radiation, and by developing the image with other treatment as may be desired to assure the existence of a relief image on the surface. The resulting image layer having darker and lighter areas together with surface perturbations, is displayed by means of schlieren optics. The invention may be viewed as a way to compress the dynamic range considerably, i.e., of converting high dynamic range to low dynamic range without loss of detail. In this way, image detail in photographs, X-ray pictures and the like, otherwise hidden by either high density or low density is much more clearly displayed. Such image enhancement has been achieved by photographs having a high degree of contrast so that detail is hidden in some areas of the photograph as a result of glare and is hidden in other areas of the same photograph as a result of heavy shadow.

The general nature of the invention having been set forth, the invention may be more clearly understood in connection with the accompanying drawings in which:

FIG. 1 is a diagrammatic view of apparatus according to one embodiment of the invention;

FIG. 2 is a diagrammatic view of apparatus according to another embodiment of the invention;

FIG. 3 is a front view of a color filter suitable for use in another embodiment of the invention;

FIG. 4 is a diagrammatic view of apparatus according to another embodiment of the invention; and FIG. 5 is a diagrammatic view, in section, of a fragment of a photorecord in conjunction with the embodiment of the invention illustrated in FIG. 4.

SPECIFIC DESCRIPTION OF THE INVENTION

In FIG. 1 is illustrated a light source 11 directing light through a collimating lens 12 to a beam splitter 14. As illustrated, light from the beam splitter is directed to an object 15 and is reflected directly back to and through the beam splitter 14 to a lens 16. Lens 16 focuses the light beam onto a spatial filter 17 and through filter 17 to an image plane 18.

The light source 11 of FIG. 1 may be any suitable source such as, for example, a mercury arc, a laser, or the like. As illustrated, light from this source is directed to the object 15 which is the image-bearing photoreceptor whose image is being enhanced. The reflected light, being a combination of specular reflection and light scattered from surface irregularities, is then directed to filter 17 which may for example be an opaque disk positioned substantially at the focal point of lens 16 in the manner well known as schlieren optics. At the image plane 18, there is displayed an image corresponding to the surface relief or surface perturbations on the surface of the film or object 15. The surface perturbations of the object in turn correspond approximately to the density gradient in the object, such as a photographic film, rather than to the densities themselves of such film, with the result that relatively small differences in absolute density become visible simultaneously in both bright and dark picture areas.

In the embodiment illustrated in FIG. 1, there is employed what is known as dark field schlieren optics in which the surface relief characteristics of the object 15 are displayed as light image areas in a dark background or dark field. In FIG. 2 is illustrated another embodiment of the invention of a type known as bright field schlieren optics. A light source 21 directs light through collimating lens 22 and to an object 25. Light is reflected from object 25 to a lens 26 and focused to and through filter 27 to an image plane 28. In this embodiment, filter 27 is characterized by having a small aperture 29 substantially at the focal point of lens 26, with the result that light which is specularly reflected off object 25 is directed to the image plane 28 while scattered light is blocked by the filter. Aperture 29 may, for example, be roughly of a size typically expressed in photographic terms as about f10 to about f25. Accordingly, there is displayed on the image plane 28 an image corresponding to object 25 wherein the scattering of the light results in dark image areas in an otherwise bright field. This form of the invention is in accordance with what is known as bright field schlieren optics.

The filter 17 of FIG. 1 or the filter 27 of FIG. 2 can be, as illustrated in the figures, a transmission control member. As shown in FIG. 1, filter 17 is an opaque filter or a light block adapted to block or prevent the transmission light focused at the focal point of lens 16. Correspondingly, filter 27 of FIG. 2 is a transmission type filter adapted and positioned to transmit light at the focal point of lens 26 and to block light other than that at the focal point. Accordingly, these transmission type filters 17 and 27 result in the formation of light or dark images at the image plane 18 or the image plane 28. Instead of transmission type filters as illustrated, there may be employed color filters, polarization filters, phase filters, spatial pattern filters, and combinations of various types of these filters, devices and systems for interference phase contrast and the like.

In FIG. 3 is shown for example, a color filter 27 suitable for use in the embodiment according to FIG. 2, wherein a centrally located area 29A is a filter of a first color such as, for example, a red section or aperture within a surrounding area of another color such as a surrounding disk area 27A of a second color such as, for example, green. With this color filter, there will be formed at the image plane 28 two color images corresponding to the colors of the central area 29A and the surrounding area 27A. Various other color contrast mechanisms also may be employed.

In the embodiment shown in FIG. 4 and FIG. 5, a line light source 31 directs light to a collimating lens 32 and in turn to a beam splitter 34, an object 35, a lens 36, and thence to an image plane 38. Positioned between the object 35 and the image plane 38 may be two filter members 37A and 37B. FIG. 5 illustrates a section of object 35 having a surface relief image in which there are perturbations, with walls 39A slanted in a first direction and walls 39B slanted in a second direction. If, for example, filter 37A of FIG. 4 is a filter of one color and filter 37B of FIG. 4 is a filter of another color, there will be projected onto the image plane 38 line patterns of these two colors resulting from the perturbations.

It will be apparent that many modifications may be made without departing from the scope of the invention. Illustratively, the object 15 of FIG. 1, or comparable member of the other figures, ordinarily is a photographic film either in its normal state or with pre-treatment such as nondestructive treatment like tanning or the like to emphasize its surface perturbations without otherwise altering the nature of the film or other object. In addition, certain relatively destructive operations such as metallic deposition, chemical bleaching or the like can enhance the usefulness of the object for purposes of this invention. Objects other than photographic film may be similarly viewed, and analogous objects of this sort would include photo-reproductions formed by other photoresponsive methods, lithographic masters and the like.

What is claimed is:

1. Image enhancement apparatus adapted to display increased detail in greatly lighter and greatly darker areas of a photographic film which has surface perturbations in areas of density gradations comprising
    a light source,
    a means to direct light from said source to a photographic film at an object plane for specular reflection from said plane,
    a spatial filter,
    a means to focus reflected light from said plane to a focal position substantially at said spatial filter and to direct light from said filter to an image plane,
    whereby scattered light from said surface perturbation and specularly reflected light from said object plane are differentiated by said spatial filter to project at said image plane an image corresponding to said surface perturbations.

2. Apparatus according to claim 1, wherein said spatial filter is adapted and positioned to preferentially block specularly reflected light from said object plane and to preferentially pass scattered reflected light from said object plane.

3. Apparatus according to claim 1, wherein said spatial filter is adapted and positioned to preferentially pass specularly reflected light from said object plane and to preferentially block scattered reflected light from said object plane.

4. A method of image enhancement wherein a photographic image on a photographic film is caused to display increased detail in greatly lighter and greatly darker areas, comprising
    forming a latent photographic image on a photographic film by exposure to activating radiation including strong contrast between bright and dark areas,
    developing said latent image to form an image layer having dark image areas and light image areas and, in addition to said dark and light areas, having substantial surface perturbations in areas of varying contrast,
    reflecting from the surface of said image layer light containing information imparted thereto by said surface perturbations, and
    displaying said reflected light by schlieren optics
    whereby the image information imparted to the reflected light by the surface perturbations is visible to display said varying contrast.

5. The method of claim 4 wherein said light containing information imparted by surface perturbations is selectively passed by schlieren optics to a display location and light specularly reflected from said image layer is selectively blocked by schlieren optics.

6. The method of claim 4, wherein said light containing information imparted by surface perturbations is selectively blocked by schlieren optics and light specularly reflected from said image layer is selectively passed to a display location.

7. The method of claim 4 wherein the photoreceptor is a photographic film having thereon an X-ray image.

* * * * *